US012637994B2

(12) United States Patent
Brown

(10) Patent No.: US 12,637,994 B2
(45) Date of Patent: May 26, 2026

(54) FUEL SYSTEM HAVING DUAL FUEL QUILL CONNECTOR AND QUILL CONNECTOR INSTALLATION METHOD

(71) Applicant: Caterpillar Inc., Peoria, IL (US)

(72) Inventor: Cory A. Brown, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/897,965

(22) Filed: Sep. 26, 2024

(65) Prior Publication Data

US 2026/0085651 A1 Mar. 26, 2026

(51) Int. Cl.
*F02M 55/00* (2006.01)

(52) U.S. Cl.
CPC .................................. *F02M 55/005* (2013.01)

(58) Field of Classification Search
CPC .... F02M 61/168; F02M 55/00; F02M 55/004; F02M 55/02; F02M 55/025; F02M 55/008; F02M 41/00; F02M 43/04; F02M 55/002
USPC ...... 239/584, 533.2; 123/469, 470, 468, 445
See application file for complete search history.

(56) References Cited

U.S. PATENT DOCUMENTS

| | | | | |
|---|---|---|---|---|
| 6,279,540 | B1 | 8/2001 | Greaney et al. | |
| 8,522,752 | B2 | 9/2013 | Kim et al. | |
| 8,726,884 | B2 | 5/2014 | Hackett | |
| 9,175,651 | B2 | 11/2015 | Kim et al. | |
| 9,506,436 | B2 | 11/2016 | Voutilainen | |
| 9,670,889 | B2 | 6/2017 | Dugad et al. | |
| 11,708,810 | B1 | 7/2023 | Nagaraja et al. | |
| 2012/0055448 | A1 * | 3/2012 | Kim | F02M 43/00 123/456 |
| 2012/0325180 | A1 | 12/2012 | Montgomery | |
| 2013/0319373 | A1 | 12/2013 | Brown et al. | |
| 2018/0100476 | A1 * | 4/2018 | Brown | F02D 41/3094 |
| 2024/0044308 | A1 | 2/2024 | Schroeder et al. | |

FOREIGN PATENT DOCUMENTS

| | | | | | |
|---|---|---|---|---|---|
| CA | 2635410 | A1 | * | 10/2008 | F02M 43/00 |
| CN | 204748477 | U | * | 11/2015 | |
| EP | 3143274 | B1 | | 2/2018 | |
| JP | 2001221127 | A | * | 8/2001 | F02M 55/005 |
| KR | 20030016964 | A | | 3/2003 | |
| WO | WO-2017050850 | A1 | * | 3/2017 | F02M 55/005 |

OTHER PUBLICATIONS

Written Opinion and International Search Report for Int'l. Patent Appln. No. PCT/US2025/045282, mailed Jan. 19, 2026 (10 pgs).

* cited by examiner

*Primary Examiner* — George C Jin
*Assistant Examiner* — Teuta B Holbrook

(57) ABSTRACT

A quill connector in a dual fuel engine system includes a first fuel conduit for a first fuel extending to a first fuel outlet in a flat sealing face, and a second fuel conduit for a second fuel extending to a second fuel outlet in the flat sealing face. The quill connector is installed in a cylinder head for providing feeds of two different liquid fuels such as a liquid alcohol fuel and a diesel fuel for combustion in an engine. A rough alignment pin and a fine alignment pin are used to position the quill connector during installation. Related apparatus and methodology is also disclosed.

18 Claims, 5 Drawing Sheets

FUEL SYSTEM HAVING DUAL FUEL QUILL CONNECTOR AND QUILL CONNECTOR INSTALLATION METHOD

TECHNICAL FIELD

The present disclosure relates generally to a dual fuel system, and more particularly to a dual fuel quill connector and installation strategies therefor.

BACKGROUND

Dual fuel systems are well-known and widely used throughout the world in a variety of internal combustion engine applications. Engineers have developed a number of different strategies over the years enabling an engine to operate on a first fuel, a second fuel, a blend of a first fuel and a second fuel, and in some implementations even more than two fuel types.

Dual fuel engines that operate using a relatively small pilot charge of a compression-ignition liquid fuel to ignite a larger main charge of a direct-injected, port-injected, or fumigated gaseous fuel have been commercially available for decades. In recent years, engineering efforts have been increasingly directed at dual liquid fuel strategies such that the engine can operate at least predominantly on one or the other of two liquid fuel types, and sometimes blends, depending upon application and performance requirements. Typically the multiple different fuel types have different properties such as levels of certain emissions when combusted, energy density, or other factors such as availability and cost. Efforts are now being made to commercialize strategies relating to a direct-injected pilot charge of a compression-ignition liquid fuel that ignites a larger main charge of a second, directly injected liquid fuel.

Single-fuel engines have long been known that employ a so-called "common rail" or other pressurized fuel reservoir to store a volume of fuel at an injection pressure. Fuel injectors fluidly connected to the common rail can be actuated to reliably inject the stored pressurized fuel. Dual fuel common rail engine platforms are known which provide two dedicated common rails for different fuel types. Pressurizing and storing a relatively large volume of even one type of fuel creates containment challenges among other considerations, requiring robust and costly hardware, seals, and costly monitoring and/or control equipment, and as well as more generally presenting harsh operating conditions. Attempting to provide two separate subsystems for two fuels of course compounds these challenges. Despite much promise in this technical field, there remain a number of obstacles heretofore limiting adoption of dual liquid fuel engine platforms. One known dual fuel engine strategy is set forth in United States Patent Application Publication No. 20240044308A1 to Schroeder et al.

SUMMARY

In one aspect, a fuel system includes a fuel injector having a first flat sealing face, a first fuel inlet formed in the first flat sealing face, a second fuel inlet formed in the first flat sealing face, and at least one nozzle outlet. The fuel system further includes a quill connector having a second flat sealing face, the quill connector forming a first fuel conduit extending to a first fuel outlet formed in the second flat sealing face and fluidly connected to the first fuel inlet, and a second fuel conduit extending to a second fuel outlet formed in the second flat sealing face and fluidly connected to the second fuel inlet. The fuel system further includes a metal-to-metal seal formed by the first flat sealing face and the second flat sealing face.

In another aspect, a quill connector includes a base forming connection ports for a first fuel and a second fuel, and an elongate central body extending from the base to a distal end having a flat sealing face. The quill connector further includes a first fuel conduit formed in the elongate central body and extending to a first fuel outlet formed in the flat sealing face, and a second fuel conduit formed in the elongate central body and extending to a second fuel outlet formed in the flat sealing face.

In still another aspect, a method of installing a quill connector includes inserting a quill connector into a quill bore formed in a cylinder head, and positioning a rough alignment pin projecting from the quill connector in a void formed in the cylinder head to roughly align the quill connector for insertion. The method further includes advancing the quill connector further into the quill bore, and positioning a fine alignment pin projecting from the quill connector in a void formed in a fuel injector supported in the cylinder head to finely align the quill connector for fluid connection to the fuel injector. The method further includes applying a sealing load to the quill connector to form a metal-to-metal seal between a sealing face of the quill connector and a sealing face of the fuel injector to fluidly connect a first fuel outlet of the quill connector to a first fuel inlet of the fuel injector and to fluidly connect a second fuel outlet of the quill connector to a second fuel inlet of the fuel injector.

DETAILED DESCRIPTION

Figure 1:
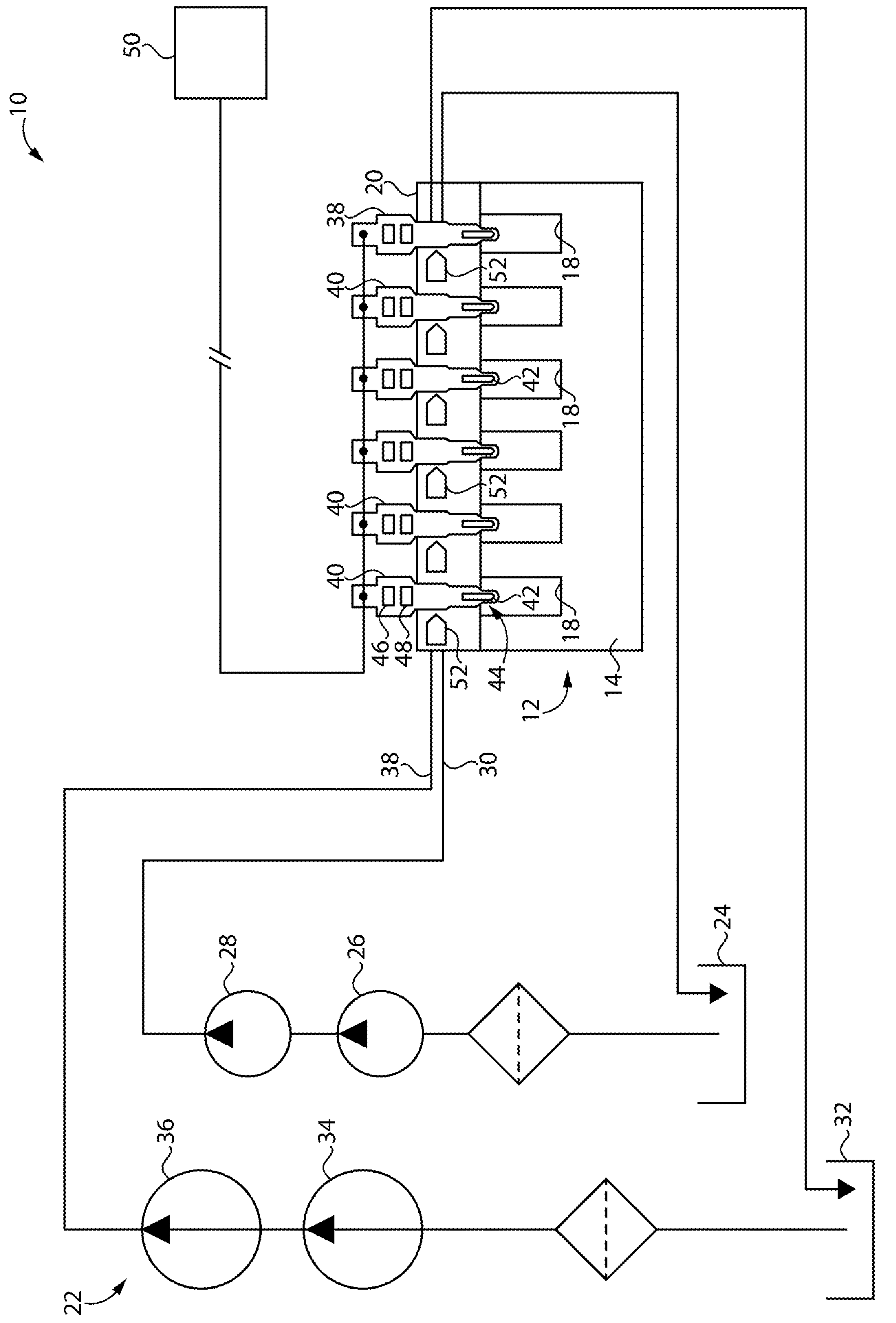
FIG. 1 is a diagrammatic view of a dual fuel engine system, according to one embodiment.

Referring to FIG. 1, there is shown a dual fuel internal combustion engine system 10 according to one embodiment. Engine system 10 includes a dual fuel engine 12 having a cylinder block 14 with a plurality of cylinders 18 formed therein. A cylinder head 20 is attached to cylinder block 14. It will be appreciated that cylinders 18 will conventionally be equipped with a plurality of pistons movable in a generally conventional manner between a top-dead-center position and a bottom-dead-center position to operate a load. Engine system 10 can be applied in any environment, including for operating a pump, a compressor, a driveline in a land vehicle or a marine vessel, or powering an electrical generator, for example. Cylinders 18 can be of any number in any suitable arrangement such as an in-line pattern, a V-pattern, or still another.

Engine system 10 also includes a dual fuel system 22. Fuel system 22 includes a first fuel supply 24 containing a first liquid fuel, a low-pressure transfer pump 26, and a high-pressure pump 28 structured to pressurize the first liquid fuel contained in first fuel supply 24 to an injection pressure. High-pressure pump 28 feeds the pressurized fuel to a first pressurized fuel reservoir 30, such as a first common rail. Fuel system 22 also includes a second fuel supply 32 containing a second liquid fuel, a low-pressure transfer pump 34, and a high-pressure pump 36 structured to pressurize the second liquid fuel contained in second fuel supply 32 to an injection pressure and feed the same to a second pressurized fuel reservoir 38, such as a second common rail.

The first fuel contained in first fuel supply 24 may include a higher cetane number compression-ignition fuel such as a diesel distillate fuel, for example. The second fuel contained in second fuel supply 32 may include a lower cetane number fuel such as an alcohol fuel, including methanol, ethanol, or various blends, for example. In other embodiments the first fuel might include a lower cetane number fuel blended with a cetane enhancer, JP8 or similar fuels, for example, or still others. The second fuel could include that same lower cetane number fuel. The second fuel might also include gasoline or various blends. In still other instances the first fuel and the second fuel could include the same fuel supplied at two different fuel pressures. It should further be appreciated that fuel system 22 might be configured to supply more than two fuels to engine 12, blend fuels on the fly, or utilize fuels having various other compositions or attributes not specifically disclosed herein.

Also in a practical implementation, the first fuel may be injected into cylinders 18 in a relatively small or pilot volume, and compression-ignited to trigger ignition of a larger injected volume of the second fuel. In various instances, engine 12 could be operated, at times, in a first fuel-only or diesel-only mode, such as in response to a load demand at or near a rated load, or in response to transients, for example. At other times engine 12 can be operated in a dual fuel mode, potentially at a range of substitution ratios of methanol or another first fuel to diesel. It should be appreciated the present disclosure is not limited with regard to fuel type or fuel system architecture apart from the capability of selectively supplying at least two different fuels to engine 12.

Fuel system 22 further includes a plurality of fuel injectors 40. Fuel injectors 40 may include direct fuel injectors each including an injector tip 42 in a nozzle assembly 44 extending into a respective one of cylinders 18. Fuel injectors 40 may be electrically actuated, such as solenoid actuated, by way of a first injection control valve 46 for controlling injection of the first fuel, and a second injection control valve 48 for controlling injection of the second fuel. Fuel system 22 also includes an electronic control unit or ECU 50 for controlling fuel injectors 40.

Figure 2:
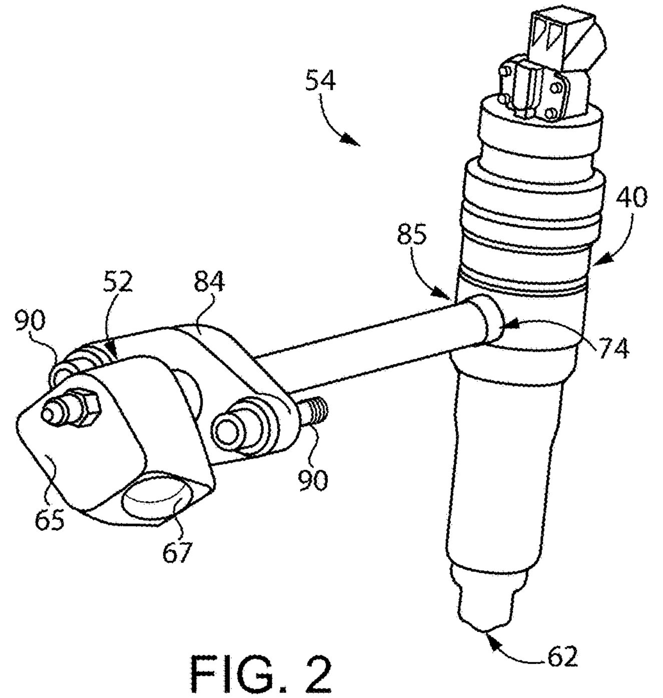
FIG. 2 is a diagrammatic view of a quill and fuel injector assembly, according to one embodiment.
Figure 3:
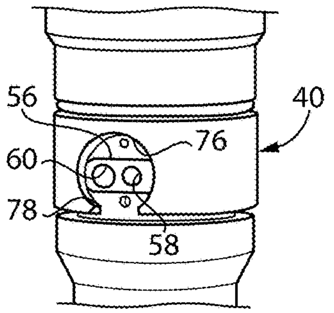
FIG. 3 is a partial side view of a portion of a fuel injector as in FIG. 2.
Figure 4:
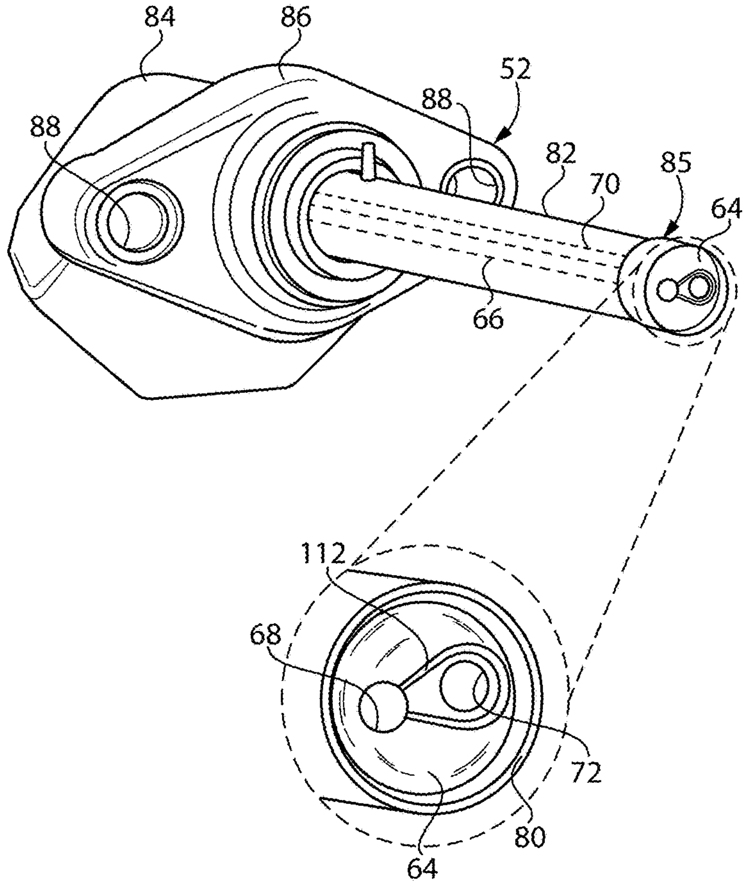
FIG. 4 is a diagrammatic view, including a detailed enlargement, of a quill connector, according to one embodiment.

Referring also now to FIGS. 2-4, each of fuel injectors 40, hereinafter referred to, at times, in the singular, includes a first flat sealing face 56, a first fuel inlet 58 formed in first flat sealing face 56, a second fuel inlet 60 formed in first flat sealing face 56, and at least one nozzle outlet 62. In a practical implementation, the at least one nozzle outlet 62 can include a first set of spray orifices for injecting the first fuel and a second set of spray orifices for injecting the second fuel. Two separate injection control outlet checks, shown diagrammatically in FIG. 5, may be provided for selectively opening and closing the respective sets of spray orifices, with first injection control valve 36 and second injection control valve 48 operated to selectively control a closing hydraulic pressure on the respective checks to control fuel injection in a generally known matter. Dual concentric checks or side-by-side checks are both within the scope of the present disclosure.

As depicted in FIG. 2, fuel injector 40 may be arranged, at least when installed for service, in a quill and injector assembly 54 including one fuel injector 40 and one quill connector 52. As illustrated in FIG. 1, a plurality of quill connectors 52 may be supported in cylinder head 20 and form a plurality of quill and injector assemblies with fuel injectors 40. As also further discussed herein, each quill connector 52, also referred to herein, at times, in the singular, is specially configured for sealing with a respective fuel injector 40 and providing two feeds of fuel from the respective first fuel supply 24 and second fuel supply 32 via first common rail 30 and second common rail 38, respectively.

Quill connector 52 includes a second flat sealing face 64. Quill connector 52 also includes a first fuel conduit 66 extending from a first fuel connection port 65 for the first fuel to a first fuel outlet 68 formed in second flat sealing face 64 and fluidly connected to first fuel inlet 58 of fuel injector 40. Quill connector 52 also includes a second fuel conduit 70 extending from a second fuel connection port 67 for the second fuel to a second fuel outlet 72 formed in second flat sealing face 64 and fluidly connected to second fuel inlet 60 of fuel injector 40.

When installed for service, a metal-to-metal seal 74 is formed by first flat sealing face 56 and second flat sealing face 64. It should be appreciated the term “flat” as used herein means planar, as would be understood by a person of ordinally skill in the art, such as within measurement error, or “flat” relative to other features of the respective fuel injector 40 or quill connector 52 that are rounded. A routine tolerance to the relative flatness of first flat sealing face 56 and second flat sealing face 64 would typically be applied, as would be understood by a person of ordinary skill in the art.

Focusing on FIG. 3, fuel injector 40 forms a recess 76 that receives a distal end 85 of quill connector 52. First flat sealing face 56 may be within recess 76. Recess 76 may further form a guide cone 78, including a conical surface at an outer extremity of recess 76, that can assist in guiding quill connector 52 during installation. Guide cone 78 may extend at least partially circumferentially around first flat sealing face 56. As can be seen in FIG. 4, quill connector 52 may further include a projecting standoff wall 80 extending circumferentially around second flat sealing face 64. Standoff wall 80 can assist in preventing handling damage or the like to second flat sealing face 64, for example. Quill connector 52 may further include an elongate central body 82 extending from a base 84 forming fuel connection ports 65 and 67. Elongate central body 82 extends from base 84 to distal end 85 whereupon flat sealing face 64 is located. In the illustrated embodiment, first fuel conduit 66 and second fuel conduit 70 are arranged side-by-side in elongate central body 82.

Figure 5:
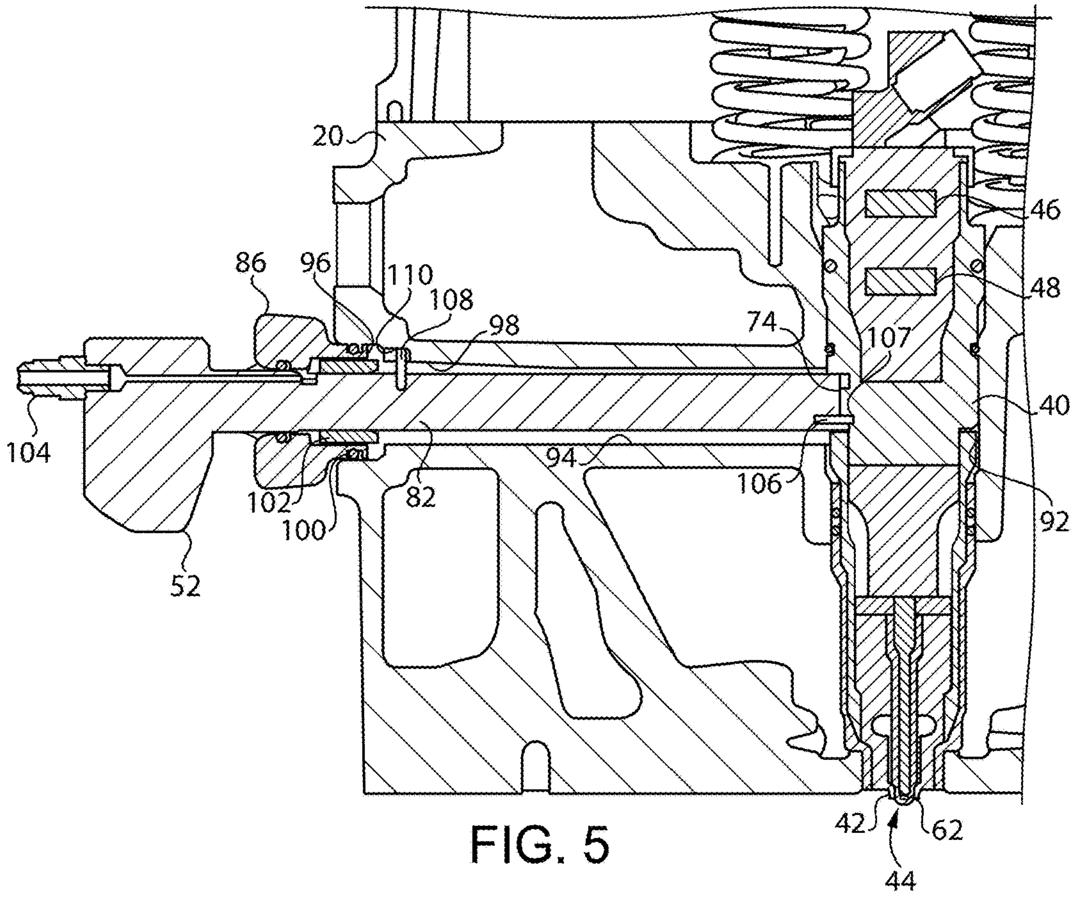
FIG. 5 is a sectioned side diagrammatic view of a portion of a dual fuel engine system, according to one embodiment.

Referring also now to FIG. 5, there are shown quill connector 52 and fuel injector 40 installed in cylinder head 20. Fuel injector 40 may be received in an injector bore 92. Quill connector 52 may be received in a quill bore 94 that intersects injector bore 92. The respective flat sealing faces 56 and 64 are in abutment with one another, under a sealing load so as to establish metal-to-metal seal 74. It can also be seen from FIG. 5 that quill connector 52 includes a cylinder head engagement piece 86. Cylinder head engagement piece 86 extends circumferentially around elongate central body 82 and is rotatable relative to elongate central body 82. As shown in FIGS. 2 and 4, for example, cylinder head engagement piece 86 may include a collar having bolt holes 88 formed therein and receiving bolts 90. Bolts 90 may be threaded-engaged in cylinder head 20 in a manner applying a load on quill connector 52 that urges second flat sealing face 64 against first flat sealing face 56.

Cylinder head engagement piece 86 may be rotatable relative to elongate central body 82 and may form a wetted wall 96 of a leaked fuel collection cavity 98 extending circumferentially around elongate central body 82. A drain connector 104 may be supported in base 84 and receives collected fuel that might leak from quill connector 52 and/or metal-to-metal seal 74. An O-ring 100 may seal between cylinder head engagement piece 86 and cylinder head 20. Also in the illustrated embodiment, a collar piece 102 is positioned on cylinder head engagement piece 82, and may be threaded-engaged therewith, and transmits a sealing load applied by engagement of cylinder head engagement piece 86 with cylinder head 20 establishing metal-to-metal seal 74.

The present disclosure further contemplates features and apparatus for performing installation of quill connector 52 in cylinder head 20 and establishing metal-to-metal seal 74. Quill connector 52 may further include a first locating pin 106 at a distal location, and received in a void or hole 107 formed in fuel injector 40, such that first locating pin 106 extends into fuel injector 40. Quill connector 52 may further include a second locating pin 108 at a proximal location and received in a recess 110 in cylinder head 120.

Referring back briefly to FIG. 4, and focusing on the detailed enlargement, quill connector 52 may further include a sealing moat 112 formed in second flat sealing face 64. Sealing moat 112 may include a groove formed in second flat sealing face 64 that is fluidly connected to first fuel outlet 68 and extends circumferentially around second fuel outlet 72. During service the first fuel, typically diesel, will usually be maintained at a higher pressure in first common rail 30 than the second fuel in second common rail 38. Any of the second fuel that might otherwise leak from second fuel outlet 72 will tend to encounter the higher-pressure diesel in sealing moat 112, and be prevented from leakage and migration. In another embodiment, a sealing moat configured analogously to sealing 112 could be formed in second flat sealing face 64, providing generally analogous functionality.

Figure 6:
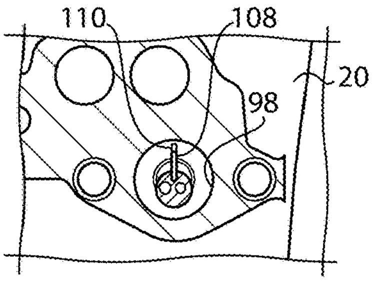
FIG. 6 is a view into a quill bore in a cylinder head, according to one embodiment.

Focusing now on installation procedures of quill connector 52, and referring to FIG. 6, there can be seen locating pin 108 as it might appear having been inserted into quill bore 94 and recess 110. It will be appreciated it is necessary to install quill connector 52 into quill bore 94 and establish metal-to-metal seal 74 so that appropriate fluid connections are made between respective parts of a feed path of the first fuel and a feed path of the second fuel. Put differently, it can be critical to properly align first fuel outlet 68 with first fuel inlet 58 and to properly align second fuel outlet 72 with second fuel inlet 60. An installation technician will generally not be able to visually confirm proper installation orientation, thus locating pins 108 and 106 can assist in properly positioning quill connector 52 during installation. In a practical implementation, alignment pin 108 includes a rough alignment pin, and alignment pin 106 includes a fine alignment pin. Alignment pin 108 can be guided into recess 110 in advance of alignment pin 106 entering hole 107, performing a rough alignment of quill connector 52 first and a fine alignment next, as will be appreciated.

Figure 7:
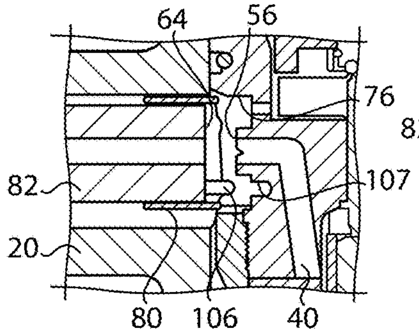
FIG. 7 is a sectioned side diagrammatic view at one stage of quill connector installation, according to one embodiment.
Figure 8:
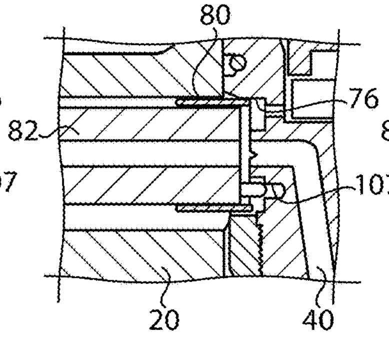
FIG. 8 is a sectioned side diagrammatic view at another stage of quill connector installation, according to one embodiment.
Figure 9:
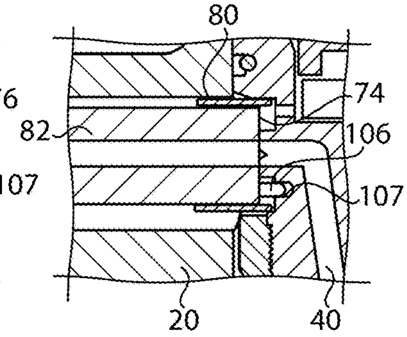
FIG. 9 is a sectioned side diagrammatic view at yet another stage of quill connector installation, according to one embodiment.

FIG. 7 illustrates quill connector 82 as it might appear in proximity to fuel injector 40 at such time as when alignment pin 108 has been received in recess 110. At this point, standoff wall 80 can engage guide cone 78 which will tend to center quill connector 82 in recess 110 and allow fine alignment pin 106 to reach hole 107 while preventing locating pin 106 from contacting sealing face 56. FIG. 8 shows quill connector 52 having been inserted into quill bore 94, and second or rough alignment pin 108 used to roughly align quill connector 52 for insertion. Quill connector 52 can then be advanced further into quill bore 94, positioning first or fine alignment pin 106 in hole 107, approximately as illustrated. Fine alignment pin 106 can then be further inserted as quill connector 52 is positioned at a final installation location and orientation, and bolts 90 tightened into threaded engagement into cylinder head 20 to apply an appropriate sealing load between sealing faces 56 and 64. Moat 112 may be established as a backup sealing moat defined between quill connector 52 and fuel injector 40 as discussed above.

Figure 10:
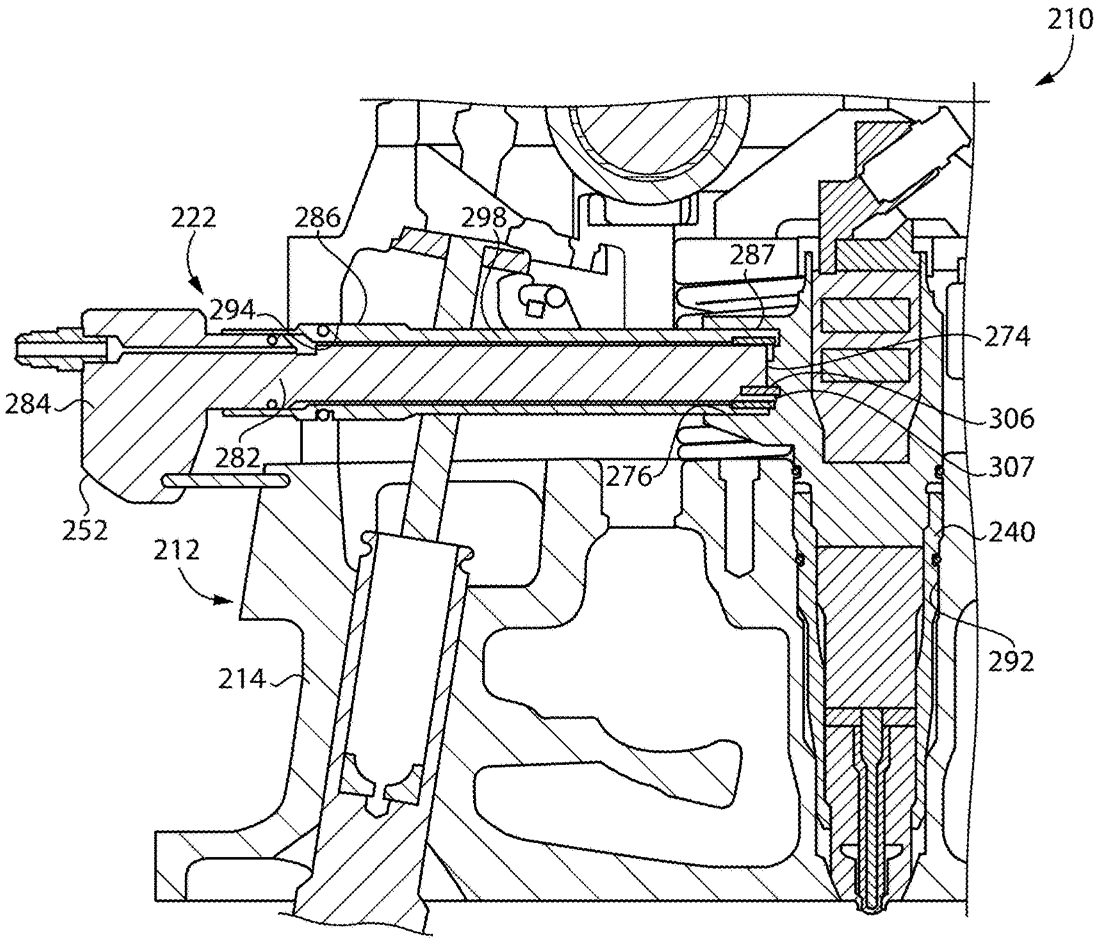
FIG. 10 is a sectioned side diagrammatic view of portions of a dual fuel engine system, according to another embodiment.
Figure 11:
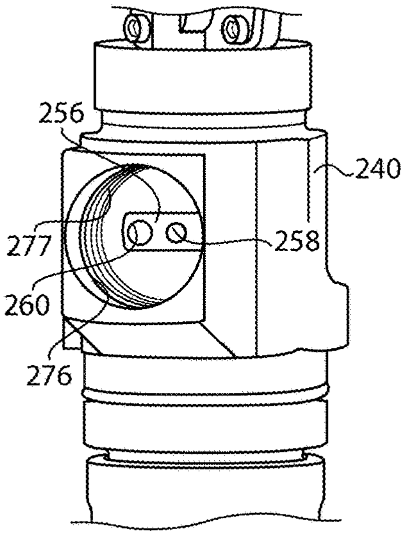
FIG. 11 is a partial diagrammatic view of a fuel injector, as in the dual fuel engine system of FIG. 10.
Figure 12:
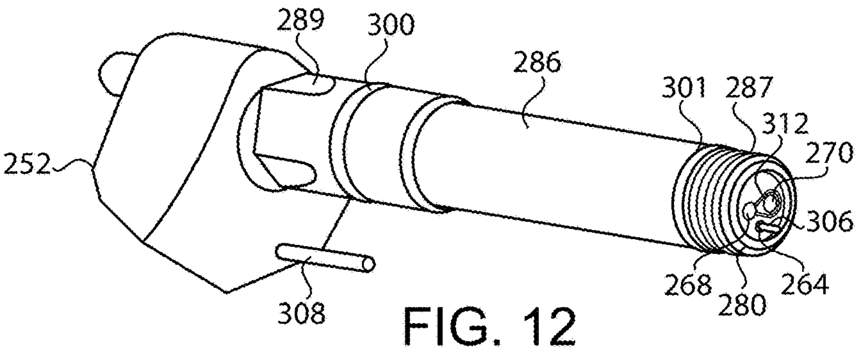
FIG. 12 is a diagrammatic view of a quill connector, as in the dual fuel engine system of FIG. 10.

Referring now to FIGS. 10, 11, and 12, there is shown a dual fuel engine system 210 according to another embodiment. Engine system 210 includes a dual fuel engine 212 having a cylinder head 214, and a fuel system 222. Engine system 210 includes numerous similarities with the embodiment described above, but also important differences. A fuel injector 240 is installed in an injector bore 292 in a cylinder block 214. Fuel injector 240 includes a first flat sealing face 256 having a first fuel inlet 258 and a second fuel inlet 260 formed therein. First flat sealing face 256 is positioned in a recess 276 of fuel injector 240 that is internally threaded having threads 277.

Fuel system 222 also includes a quill connector 252 positioned in a quill bore 294. Quill connector 252 includes a second flat sealing face 264 having a first fuel outlet 268 and a second fuel outlet 270 formed therein. A metal-to-metal seal 274 is formed between first flat sealing face 256 and second flat sealing face 264. Quill connector 252 also includes a base 284, an elongate central body 282 forming two fuel conduits analogous to the embodiment discussed above, and a cylinder head engagement piece 286 extending circumferentially around elongate central body 282.

Figure 13:
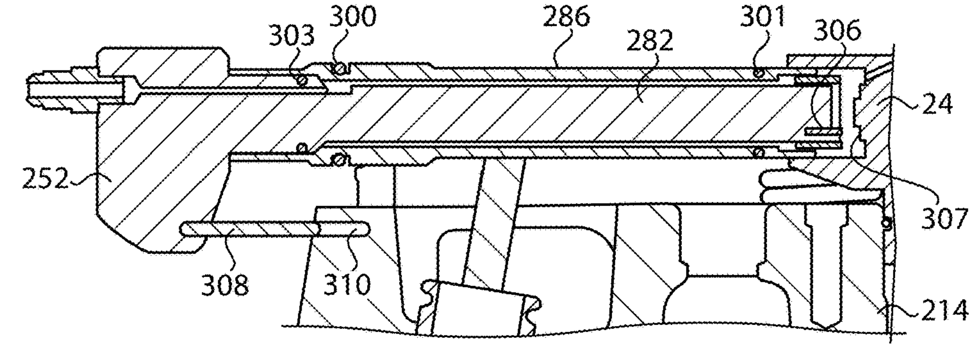
FIG. 13 is a sectioned side diagrammatic view at one stage of quill connector installation, according to one embodiment.

As shown in FIG. 12, cylinder head engagement piece 286 may include proximally located tool surfaces 289, and a distally located externally threaded tip 287 that is configured to be threaded engaged with threads 277 in recess 276. Tool engagement surfaces 289 can define a hex wrench engagement interface, or the like. A leaked fuel cavity 298 is defined between cylinder head engagement piece 286 and elongate central body 282 and cylinder head engagement piece forms a wetted wall thereof. As can also be seen from the illustrations, cylinder head engagement piece 286 may have the form of an elongate sleeve that is rotatable relative to elongate central body 282. A first O-ring 300 and a second O-ring 301 are positioned upon cylinder head engagement piece 286 to fluidly seal with cylinder head 214 and fuel injector 240, respectively. A third O-ring 303 may be positioned between central body 282 and cylinder head engagement piece 286 as shown in FIG. 13. Quill connector 252 may be equipped with a sealing moat 312 configured generally analogously to that of the embodiment discussed above, and a standoff wall 280 also analogously configured.

Figure 14:
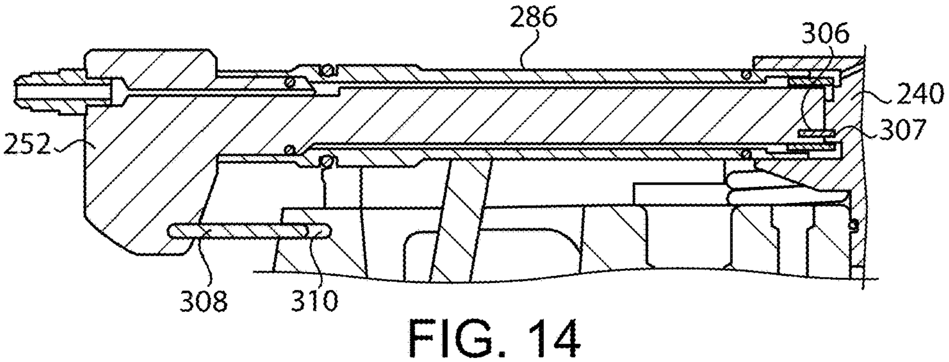
FIG. 14 is a sectioned side diagrammatic view at another stage of quill connector installation, according to one embodiment.
Figure 15:
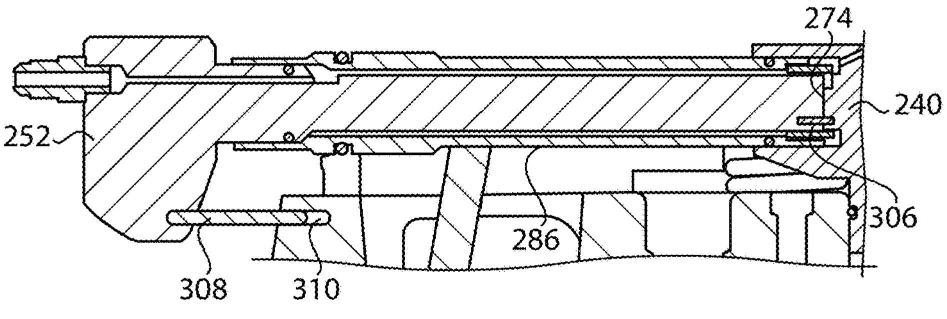
FIG. 15 is a sectioned side diagrammatic view at yet another stage of quill connector installation, according to one embodiment.

Focusing now on FIGS. 13, 14, and 15, there are shown example stages in installation of quill connector 252 in cylinder head 214 to engage with and fluidly connect to fuel injector 240. Quill connector 252 includes a first locating pin 306 that can be understood as a fine alignment pin configured to be received in a hole 307 in fuel injector 240. Quill connector 252 also includes a second alignment pin 308 or rough alignment pin configured to be received in a hole 310 formed in cylinder head 214. FIG. 13 shows quill connector 252 as it might appear just beginning installation and being inserted through quill bore 284 formed in cylinder head 214. Alignment pin 308 assists an installation technician in roughly aligning quill connector 252 for insertion. FIG. 14 shows rough alignment pin 308 within hole 310, and fine alignment pin 306 now having entered hole 307. FIG. 15 shows quill connector 252 as it might appear at a final installation location such that first flat sealing face 256 and second flat sealing face 264 are in contact. At this point, cylinder head engagement piece 282 can be rotated to threaded-engage tip 287 in recess 276 and thereby apply a sealing load to establish metal-to-metal seal 274.

INDUSTRIAL APPLICABILITY

Referring to the drawings generally, any of the quill connector or fuel injector embodiments can be sold as individual units, as part of a retrofit or new installation fuel system, or as original equipment on an engine. Quill connectors 52, 152 and injectors 40, 140 can also be installed as replacement parts and/or removed, serviced, and returned to service using the installation strategies disclosed herein. It can further be appreciated that in the case of the embodiment of FIGS. 1-9, a sealing load to establish the respective metal-to-meal seal is applied by engaging a component of quill connector 52 with cylinder head 20, and clamping quill connector 52 against fuel injector 40 supported in injector bore 92 to establish metal-to-metal seal 74. In the case of the embodiment of FIGS. 10-15, the sealing load to establish metal-to-metal seal 274 is applied by directly engaging a component of quill connector 252 with fuel injector 240 itself. The teachings herein can thus be applied to various different engine types and cylinder head configurations, potentially using rough alignment pins arranged in various ways beneficial to the particular configurations.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A fuel system comprising:

a fuel injector including a first flat sealing face, a first fuel inlet formed in the first flat sealing face, a second fuel inlet formed in the first flat sealing face, and at least one nozzle outlet;

a quill connector including a second flat sealing face, the quill connector forming a first fuel conduit extending to a first fuel outlet formed in the second flat sealing face and fluidly connected to the first fuel inlet, and a second fuel conduit extending to a second fuel outlet formed in the second flat sealing face and fluidly connected to the second fuel inlet; and a metal-to-metal seal formed by the first flat sealing face and the second flat sealing face, wherein a moat is formed in the second flat sealing face, the moat being fluidly connected to the first fuel outlet and extending circumferentially around the second fuel outlet.

2. The fuel system of claim 1 wherein the fuel injector forms a recess, and the first flat sealing face is within the recess, and wherein the quill connector further includes a projecting standoff wall extending circumferentially around the first flat sealing face.

3. The fuel system of claim 1 wherein the quill connector includes an elongate central body extending from a base, and the first fuel conduit and the second fuel conduit are arranged side-by-side in the elongate central body.

4. The fuel system of claim 3 wherein:

the quill connector includes a cylinder head engagement piece extending circumferentially around the elongate central body and rotatable relative to the elongate central body; and the cylinder head engagement piece forms a wetted wall of a leaked fuel collection cavity extending circumferentially around the elongate central body.

5. The fuel system of claim 4 wherein:

the cylinder head engagement piece includes an elongate sleeve rotatable relative to the elongate central body; and the fuel injector includes internal threads threaded-engaged with the external threads so as to apply a sealing load establishing the metal-to-metal seal.

6. The fuel system of claim 4 wherein the cylinder head engagement piece includes a collar, and bolts extending through the collar for clamping the quill connector to a cylinder head so as to apply a sealing load establishing the metal-to-metal seal.

7. The fuel system of claim 1 wherein the quill connector further includes a first locating pin at a distal location and extending into the fuel injector, and a second locating pin at a proximal location.

8. A quill connector comprising:
- a base forming connection ports for a first fuel and a second fuel;
- an elongate central body extending from the base to a distal end including a flat sealing face;
- a first fuel conduit formed in the elongate central body and extending to a first fuel outlet formed in the flat sealing face;
- a second fuel conduit formed in the elongate central body and extending to a second fuel outlet formed in the flat sealing face; and
- a plurality of locating pins.

9. The quill connector of claim 8 wherein the first fuel conduit and the second fuel conduit are arranged side-by-side in the elongate central body.

10. The quill connector of claim 9 wherein a moat is formed in the flat sealing face, the moat being connected to the first fuel outlet and extending circumferentially around the second fuel outlet.

11. The quill connector of claim 8 wherein the distal end includes a standoff wall projecting outward of the flat sealing face and extending circumferentially around the first fuel outlet and the second fuel outlet.

12. The quill connector of claim 8 further comprising a rotatable sleeve extending circumferentially around the elongate central body and including external threads, and a leaked fuel collection cavity formed between the elongate central body and the sleeve.

13. The quill connector of claim 8 further comprising a rotatable collar positioned on the elongate central body and including bolt holes extending therethrough.

14. The quill connector of claim 8 wherein the plurality of locating pins includes a first locating pin supported in the quill connector at a distal location, and a second locating pin supported in the quill connector at a proximal location.

15. A method of installing a quill connector comprising:
- inserting a quill connector into a quill bore formed in a cylinder head;
- positioning a rough alignment pin projecting from the quill connector in a void formed in the cylinder head to roughly align the quill connector for insertion;
- advancing the quill connector further into the quill bore;
- positioning a fine alignment pin projecting from the quill connector in a void formed in a fuel injector supported in the cylinder head to finely align the quill connector for fluid connection to the fuel injector; and
- applying a sealing load to the quill connector to form a metal-to-metal seal between a sealing face of the quill connector and a sealing face of the fuel injector to fluidly connect a first fuel outlet of the quill connector to a first fuel inlet of the fuel injector and to fluidly connect a second fuel outlet of the quill connector to a second fuel inlet of the fuel injector.

16. The method of claim 15 wherein the applying the sealing load includes applying a sealing load via threaded engagement between an elongate sleeve of the quill connector and the fuel injector.

17. The method of claim 15 wherein the applying the sealing load includes applying the sealing load via threaded engagement between bolts in a collar of the quill connector and the cylinder head.

18. The method of claim 15 wherein the metal-to-metal seal is formed by a first flat sealing face of the quill connector and a second flat sealing face of the fuel injector, and further comprising establishing a backup sealing moat defined between the quill connector and the fuel injector, fluidly connected to the first fuel outlet and extending circumferentially around the second fuel outlet.

* * * * *